United States Patent Office 3,561,886
Patented Feb. 9, 1971

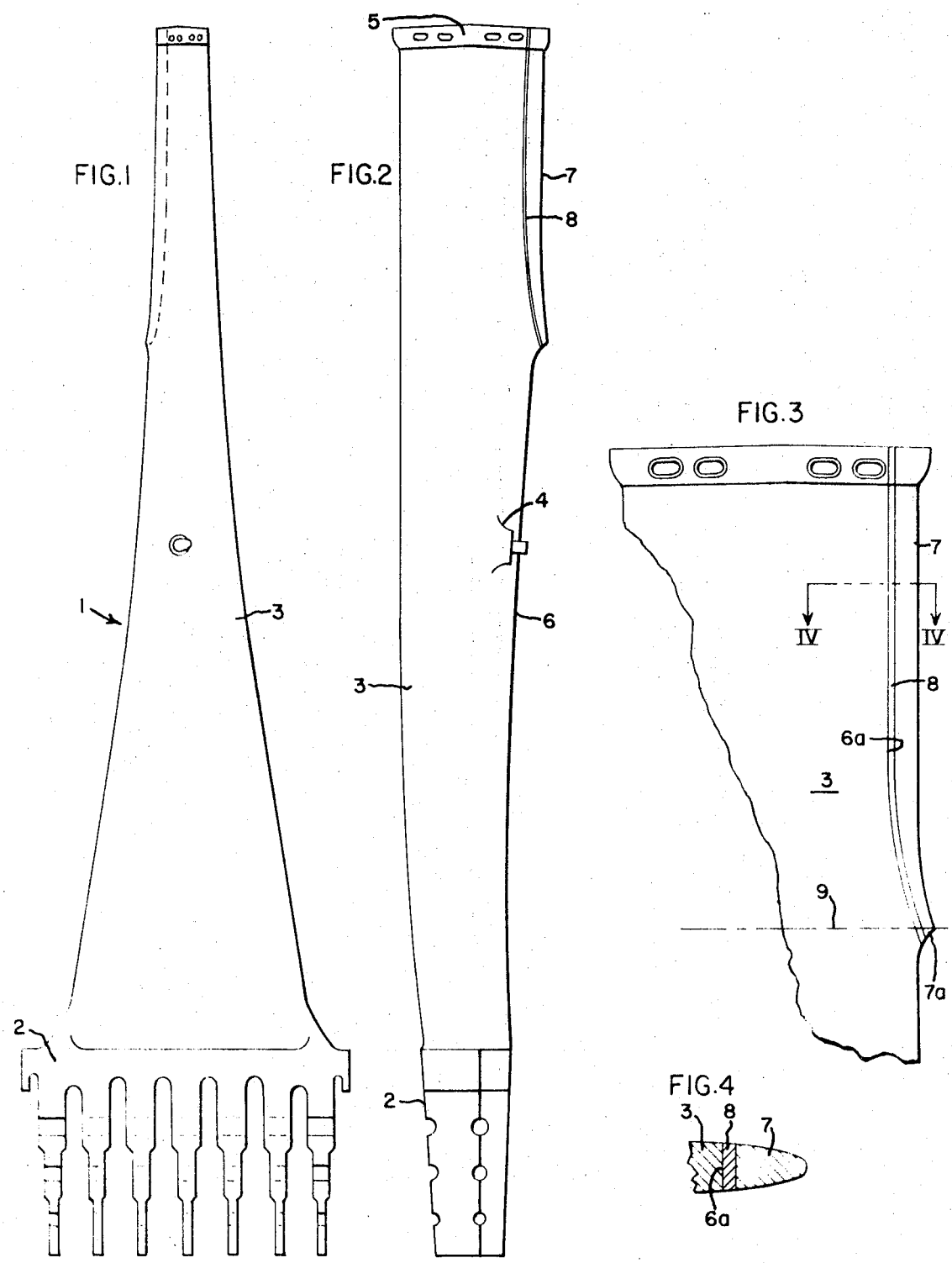

3,561,886
TURBINE BUCKET EROSION SHIELD
ATTACHMENT
Charles H. Kreischer, Jr., Schenectady, and Victor S. Musick, Scotia, N.Y., assignors to General Electric Company, a corporation of New York
Filed Feb. 7, 1969, Ser. No. 797,459
Int. Cl. F01d 5/28
U.S. Cl. 416—224
5 Claims

ABSTRACT OF THE DISCLOSURE

An erosion resistant shield is attached to the leading edge of a steam turbine bucket at the radially outer portion thereof by means of an intermediate shim using selected materials to provide a ductile composite welded structure. Controlled reduction of stress at the point where the shield commences on the bucket is accomplished by local enlargement of the bucket cross section.

BACKGROUND OF THE INVENTION

This invention relates to erosion shields for controlling or preventing moisture impact erosion on steam turbine buckets.

Erosion of the leading edges of turbine buckets caused by moisture droplets in the steam impacting on their leading edges is a well known problem. This is particularly serious at the radially outer portions of the last stage buckets for two reasons. First, there is more moisture in the steam which has been expended to this point. Secondly, the last stage buckets are rotating at high tip speeds due to their great length.

Various suggestions have been made in the prior art for attaching hard erosion resistant shields or erosion resistant moisture removal devices to the bucket leading edges. These have included shields or plates of erosion-resistant material such as Stellite, (a registered trademark of Cabot Corporation) welded or brazed to the bucket. As it usually turns out, the bucket material is an alloy of different characteristics selected for high strength and ductility and is incompatible with the erosion shield insofar as obtaining a final ductile weld joint is concerned.

Such plates have been attached by insetting into a prepared recess as shown in U.S. Pat. 3,304,056 or by tapering to zero thickness at the bucket root as shown in U.S. Pat. 3,275,295. The former approach may cause a sudden transition in bucket stress at the recess juncture, while the latter may cause problems of attachment due to thinness of the shield at its inner end.

Accordingly, one object of the present invention is to provide an improved turbine bucket erosion shield and method attachment to a turbine bucket leading edge.

Another object of the invention is to provide an improved method of attaching a shield of hard erosion-resistant material to a high strength ductile turbine bucket with a ductible composite welded joint.

Another object is to illustrate suitable materials for the aforesaid composite welded joint.

Another object of the invention is to provide an erosion shield attachment for the outer portion of a turbine bucket leading edge which provides a control of stress transition from the unshielded bucket portion to the shielded bucket portion.

DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIGS. 1 and 2 are front and side elevation drawings respectively of a complete steam turbine bucket embodying the invention, FIG. 3 is an enlarged partial view of the outer leading edge portion of the bucket showing details of the erosion shield attachment, and FIG. 4 is a cross section taken along lines IV—IV of FIG. 3 through the bucket leading edge.

SUMMARY OF THE INVENTION

Briefly stated, the invention is practiced by welding an erosion resistant shield to the bucket leading edge by employing an intermediate metallic shim strip of material weldably compatible with both bucket and shield. The bucket cross section is locally enlarged at the inner termination of the shield to control stress. Particular alloy combinations are also claimed as new for the erosion shield structure.

DESCRIPTION OF THE PREFERRED EMBODIMENT

Referring to FIGS. 1 and 2 of the drawing, a last stage steam turbine bucket, shown generally as 1, comprises a dovetail attachment portion 2 for attachment to a turbine wheel with other similar buckets, and a blade portion 3 which is radially outward from the dovetail. Dovetail 2, as shown, is of the multiple-finger type as more particularly described in U.S. Pat. 2,790,620 issued to A. W. Rankin on Apr. 30, 1957, and assigned to the present assignee.

The blade 3, as indicated, has substantial twist therein and is very highly stressed, inasmuch as the blade may be as long as 33½″ turning at 3600 r.p.m. with the tip of the blade at a 10′4″ diameter. The blade 3 is provided with "tie wire" protrusions 4 near its midpoint for attachment to similar protrusions on adjacent blades. Blade 3 also includes a thickened tip portion 5 for attaching diagonal shroud pieces between blade tips, as more particularly exemplified in U.S. Pat. 3,302,925 issued to V. S. Musick on Feb. 7, 1967, and assigned to the present assignee.

In accordance with the present invention, the leading edge 6 of the turbine bucket has attached thereto and extending over approximately the outer one-third of the blade length, an erosion shield 7 of relatively hard material selected to withstand moisture impact erosion from water droplets in the steam.

Referring now to the enlarged view of FIG. 3, the shield 7 is seen to be attached to blade 3 by means of an intermediate shim 8. At the radially inner part of the shield, both the shim 7 and shield 8 are formed so that they commence to curve away from the leading edge. The shim 8 remains of substantially uniform thickness, while the shield 7 tapers to approximately one-third of its nominal thickness. It remains about ⅛″ in thickness at its terminating end 7a so as to obtain a good weld.

In order to accommodate the shim and shield, the leading edge 6 of the blade is flat at 6a. This flat portion curves out to intersect and to extend beyond what would be the usual radial extension of leading edge 6. The overall effect at the radially inner termination of the erosion shield, designated by the line 9 in FIG. 3 is to provide a local enlargement of the bucket cross-sectional area. In other words, the cross section at 9 is greater than those cross sections immediately inward and outward thereof. As is known to those skilled in the art, the centrifugal stress in a turbine bucket generally increases as the square of the radius. The stress at any particular location is also a function of the cross-sectional area of the bucket, and the "allowable" stress is determined by the materials at that cross section. Outward of 9, the allowable stress of the composite structure is different than that of the bucket material inward of 9. In the present invention, an enlarged local cross section at the location of the commencement of the composite weld structure reduces the stress at this critical location where the erosion shield commences. The protrusion has no appreciable effect on the fluid flow aspects of the bucket.

Certain combinations of materials for the bucket 3, shim 8 and erosion shield 7 give preferred results. The below combinations provide examples of materials which are selected from weldably compatible materials to produce a ductile composite structure.

Example No. 1

The bucket material used was Crucible 422, a commercially available martensitic stainless steel alloy of nominal 12% chromium composition. This exemplifies a general class of such alloys which exhibit high strength and ductility suitable for bucket materials and cover a chromium range most typically of 10 to 14%.

The sim material used was a nickel-base chromium iron alloy known commercially as Inconel 600. The erosion shield was a hard erosion resistant cobalt-base chromium tungsten alloy commercially available as Stellite 6B. Use of electron beam welding of these materials resulted in a ductile composite weld.

Example No. 2

Titanium alloys have been explored for use as bucket materials because of their lightweight with relatively high strength. A high strength alloy of 6% Aluminum, 4% Vanadium, balance titanium described in American Military Standard Specification AMS 4928C) was electron beam welded to a commercially pure titanium shim (AMS 4900B), which had previously been diffusion bonded to an erosion shield of Stellite 6B.

Example No. 3

The titanium shim was attached to the titanium base bucket material by electron beam welding as before. However, the shield material was an erosion-resistant titanium base alloy comprising 11% tin, 2¼% aluminum, 4% molybdenum, and 0.2% silicon (designated by Imperial Metals Industries specification as IMI–680). The shield was in turn electron beam welded to the shim-bucket assembly.

In all of the foregoing examples, the welding must be performed in an inert atmosphere or in a vacuum as will be understood by those skilled in the art. Tungsten inert gas welding may also be used in some cases.

By the use of the aforedescribed composite shim and shield structure, together with the locally enlarged bucket cross section at the inner termination of the shim and shield structure to control stress levels at this juncture, a very reliable and effective erosion shield is obtained. It will be understood that the term "local enlargement" does not have any significance other than with reference to blade areas closely adjacent thereto. It means that there is a distortion in what would otherwise be a smoothly changing blade area, designed to accomplish a selected control of stress levels.

While there has been shown what is considered to be the preferred structural embodiment of the invention, together with three examples of material combinations used to practice the invention, other modifications will occur to those skilled in the art. It is, of course, intended to cover in the appended claims all such modifications as fall within the true spirit and scope of the invention.

What is claimed as new and desired to secure by Letters Patent of the United States is:

1. An erosion-resistant turbine bucket comprising:
   a bucket having a radially extending blade portion,
   a shim member of substantially uniform thickness attached to the bucket leading edge along a radially outer portion thereof,
   a shield of erosion-resistant material attached to said shim member,
   said shim and shield radially inner ends being shaped to curve out from the blade portion proper so as to define a protrusion on the blade leading edge at an intermediate location of locally enlarged cross section,
   said bucket, shim and shield being selected from weldably compatible materials and joined in a ductile composite welded structure.

2. The combination according to claim 1, wherein said bucket material is a martensitic stainless steel alloy having nominal chromium content on the order of 12%, wherein said shim material is a nickel-base chromium iron alloy, wherein said erosion shield is a cobalt-base chromium tungsten alloy.

3. The combination according to claim 1, wherein said bucket material is a high-strength titanium base alloy, wherein said shim material is titanium, and wherein said shield material is a cobalt-base chromium tungsten alloy.

4. The combination according to claim 1, wherein said bucket material is a high strength titanium-base alloy, wherein said shim material is titanium, and wherein said shield material is an erosion-resistant titanium-base alloy.

5. An erosion-resistant turbine bucket comprising:
   a bucket having a radially extending blade portion defining a curved leading edge substantially along the inner two-thirds thereof and a flat leading edge along the radially outer portion thereof, said flat and curved leading edge portions joining at an intermediate location where the local blade cross section is increased to provide a leading edge protrusion,
   a shim of substantially uniform thickness welded to the blade flat leading edge portion,
   a shield of erosion-resistant material welded to said shim portion and having a curved leading edge thereon, said shim and shield being shaped to curve away from the blade proper at the radially inner ends thereof to terminate at said intermediate location,
   said bucket, shim and shield being selected from weldably compatible materials and joined in a ductile composite structure.

References Cited

UNITED STATES PATENTS

| 1,862,579 | 6/1932 | Parsons et al. | 416—224 |
| 3,275,295 | 7/1966 | Caldwell et al. | 416—224 |
| 3,304,056 | 5/1967 | Sohma | 416—224 |

FOREIGN PATENTS

| 1,566 | 4/1926 | Australia | 416—224 |
| 309,235 | 4/1929 | Great Britain | 416—224 |
| 338,683 | 11/1930 | Great Britain | 416—224 |
| 347,173 | 4/1931 | Great Britain | 416—224 |
| 360,230 | 11/1931 | Great Britain | 416—224 |
| 548,414 | 10/1942 | Great Britain | 416—224 |

EVERETTE A. POWELL, JR., Primary Examiner

U.S. Cl. X.R.

416—241